United States Patent [19]

Milkovic

[11] 3,815,012

[45] June 4, 1974

[54] CURRENT TRANSFORMER WITH ACTIVE LOAD TERMINATION FOR PROVIDING, INTER ALIA, PHASE ANGLE ALTERATION

[75] Inventor: Miran Milkovic, Scotia, N.Y.

[73] Assignee: General Electric Company, New York, N.Y.

[22] Filed: Mar. 30, 1973

[21] Appl. No.: 346,412

[52] U.S. Cl............ 323/6, 323/44 R, 323/88, 324/123, 324/127
[51] Int. Cl............................................ G01r 19/00
[58] Field of Search .......... 321/45 C; 323/6, 120, 1, 323/8, 44, 84–88, 110; 330/103; 324/123, 127

[56] References Cited
UNITED STATES PATENTS

| | | | |
|---|---|---|---|
| 3,268,830 | 8/1966 | Ragsdale | 330/103 |
| 3,492,602 | 1/1970 | Berwin et al. | 330/103 |
| 3,564,411 | 2/1971 | Eide | 330/103 |
| 3,633,122 | 1/1972 | Braga | 330/103 |
| 3,733,538 | 5/1973 | Kernick et al. | 321/45 C |

*Primary Examiner*—Gerald Goldberg
*Attorney, Agent, or Firm*—Patrick D. Ward; Joseph T. Cohen; Jerome C. Squillaro

[57] ABSTRACT

The secondary winding of a current transformer is terminated in a virtual or near short circuit condition by an operational amplifier which has connected therewith. Circuit means, such as passive circuit elements, are provided for shifting the phase angle between current in the primary, or the secondary, winding of the current transformer and an output voltage produced by said amplifier in response to current in the secondary winding. The output voltage produced by the amplifier is proportional to the primary, or the secondary, current in the current transformer.

7 Claims, 4 Drawing Figures

CURRENT TRANSFORMER WITH ACTIVE LOAD TERMINATION FOR PROVIDING, INTER ALIA, PHASE ANGLE ALTERATION

CROSS-REFERENCES TO RELATED PATENT APPLICATIONS

A related, now abandoned U.S. Pat. application Ser. No. 262,643, earlier filed on June 14, 1972 in behalf of M. Milkovic entitled CURRENT TRANSFORMER WITH ACTIVE LOAD TERMINATION, and a related U.S. continuation Pat. application Ser. No. 365,429, filed May 31, 1973 in behalf of the same M. Milkovic and having the same title as the aforesaid abandoned patent application, discloses, inter alia, a current transformer terminated in a virtual short circuit by an active load element which also produces an output signal voltage proportional to current in the primary winding of the current transformer.

Another related co-pending U.S. Pat. application Ser. No. 346,411, filed on Mar. 30, 1973, concurrently herewith in behalf of M. Milkovic and titled CURRENT TRANSFORMER TERMINATED BY ACTIVE LOAD ELEMENTS FOR PROVIDING PHASE-INVERTED SIGNALS discloses, inter alia, a current transformer having its secondary winding terminated in a virtual short circuit condition by a pair of active load elements which provide, for example, a pair of phase-inverted output voltages proportional to current in the primary winding of the current transformer.

The entire right, title and interest in and to the inventions described in the aforesaid patent applications, as well as in and to the aforesaid patent applications, and the entire right, title and interest in and to the invention herein disclosed, as well as in and to the patent application of which this specification is a part, are assigned to the same assignee.

SUMMARY OF THE INVENTION

The subject invention pertains, in general, to terminating current transformers in a virtual short circuit condition while, at the same time, enabling the development of an output voltage signal which is proportional to current in the primary winding of the current transformer; and, in particular, to producing said output voltage and altering the phase angle thereof relative to current in the primary or secondary winding of the current transformer while said secondary winding is virtually short circuited, or nearly short circuited.

Briefly, in accordance with the invention a current transformer is combined with an operational amplifier. The current transformer includes primary and secondary windings which are adapted for conducting primary and secondary currents, respectively. The operational amplifier includes inverting and non-inverting input terminals as well as an output terminal. The operational amplifier has a relatively high open loop gain and, between its inverting and non-inverting input terminals, there exists a relatively low input impedance due to feedback action. The secondary winding may be connected directly between the inverting and non-inverting input terminals, and, thus, be in parallel relationship with the low input impedance of the amplifier so as to be virtually short circuited. Electrical impedance means are coupled with said operational amplifier. An output voltage is developed between the amplifier's output terminal and its non-inverting input terminal which is connected to point G, which is also connected to one end of the secondary winding; said output voltage being displaced by a predetermined phase angle relative to the current in the primary winding, or secondary winding. Moreover, the output voltage is proportional to current in the primary winding or the secondary winding.

As an alternative, one end of the secondary winding may be coupled via a relatively low ohmic resistance to the inverting input terminal of the operational amplifier while the other end of said secondary winding is coupled to the non-inverting input terminal thereof. Thus, the secondary winding will be terminated in a near short circuit condition while the output voltage developed by the amplifier is proportional to primary or secondary current, as well as phase displaced by a predetermined phase angle with respect to either current in the primary winding or the secondary winding.

Various objects, features and advantages of the invention are set forth hereinafter where specific illustrative embodiments of the invention are disclosed in detail with reference to the accompanying drawings.

DRAWINGS

DESCRIPTION OF PREFERRED EMBODIMENTS

Figure 1:
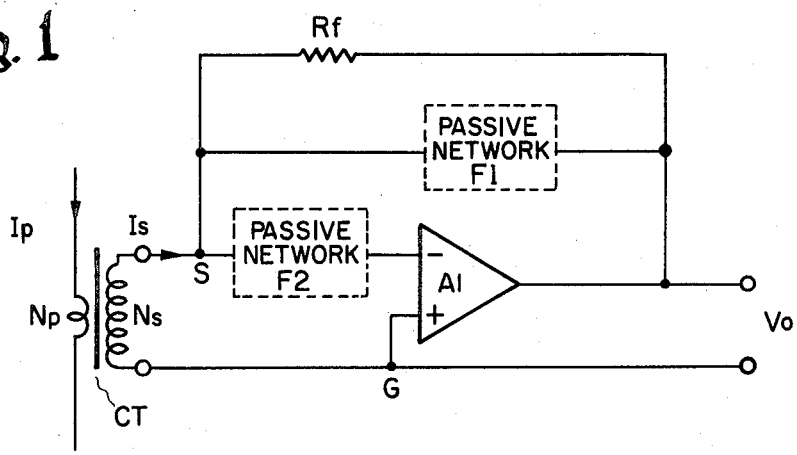
FIG. 1 is a schematic diagram of a more or less generalized form of the invention wherein the output voltage Vo leads or lags the current Is in the secondary winding of a current transformer; and output voltage being, in addition, proportional to the current in either of the transformer windings.

Throughout the drawing figures like elements are designated by the same reference character.

In FIG. 1 a current transformer CT includes a primary winding having Np turns and a secondary winding having Ns turns. As indicated, the primary winding conducts primary current Ip and the secondary winding conducts the secondary current Is. An operational amplifier A1 is provided and said amplifier includes an inverting input terminal designated by the minus sign (−) and a non-inverting input terminal designated by the plus signal (+). As indicated, one end of the secondary winding and the non-inverting input terminal of amplifier A1 are commonly connected to a common point G, or node. The opposite end of the secondary winding is coupled to a summing point S. A feedback resistance element Rf is connected between the summing point S and an output terminal of the amplifier A1. Connected in parallel with the feedback resistance element Rf is a first passive network F1. A second passive network F2 is connected in series between the summing point S and the inverting input terminal of the operational amplifier A1. As indicated, an output voltage Vo is supplied by amplifier A1 between its output terminal and another terminal commonly connected with the point G which is, in turn, commonly connected with the non-inverting input terminal of the amplifier A1. The impedances of the feedback resistor Rf, passive network F1 and passive network F2 are determinative of the phase angle between the output voltage Vo and the current Is in the secondary winding of the current transformer. The voltage Vo is proportional to either the primary current Ip or the secondary current Is. In addition, the secondary winding of the current transformer is either virtually short circuited or is at a near short circuit condition; i.e., the potential difference between the points S and G is either virtually zero or relatively small. The operational amplifier A1 has a relatively high open loop gain and in addition the input impedance between its inverting and non-inverting input terminals is relatively low. One operational amplifier, among others, suitable for the purpose is the high performance operational amplifier $\mu$A741 manufactured by Fairchild Semiconductor, a division of Fairchild Camera and Instrument Corporation, 313 Fairchild Drive, Mountain View, Calif. The resistance element Rf and the impedances of the passive networks F1 and F2 may be chosen so as to enable the output voltage Vo to either lead or lag the secondary current Is by a predetermined phase angle. In FIG. 1 the operational amplifier A1 together with the feedback resistance element Rf, passive network F1 and passive network F2 constitute a transimpedance amplifier.

With respect to FIG. 1 it is to be understood that it is a generalized diagram and that either or both of the passive networks F1 and/or F2 may be employed. The feedback resistance element Rf is also an optional element. It may be included or not depending on, inter alia, the magnitude of the required phase displacement between the output voltage Vo and transformer secondary current Is.

Figure 2:
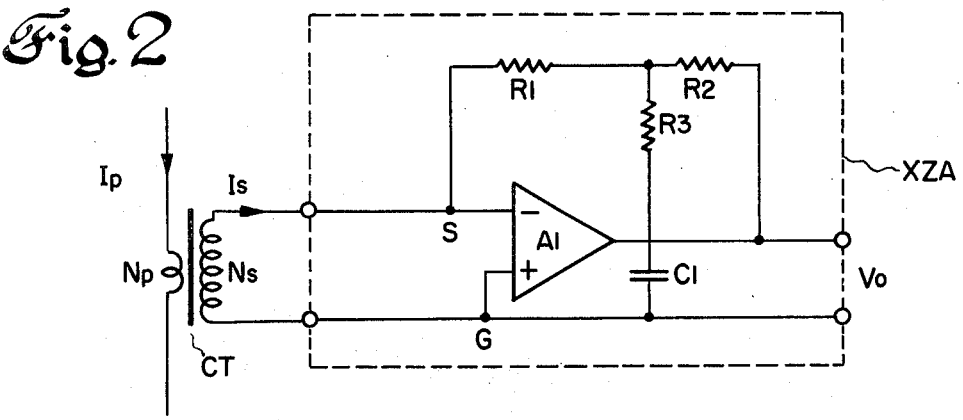
FIG. 2 is another schematic diagram showing a transimpedance amplifier (within the dotted box) terminating the secondary winding of a current transformer in a virtual short circuit condition while providing an output voltage Vo proportional to either primary or secondary transformer current and leading the transformer secondary current by a predetermined phase angle.

In FIG. 2 another embodiment of the invention is illustrated. As shown, a transimpedance amplifier XZA is included within the dotted line box. In this case the secondary winding of the current transformer is virtually short circuited and the output voltage Vo leads the secondary current Is. The operational amplifier A1, which may be the Fairchild amplifier hereinbefore identified, has two serially connected resistance elements R1 and R2 connected between point S and the output terminal of the amplifier A1. Another series circuit consisting of the resistance element R3 and capacitor C1 is connected, as shown, between the two resistance elements R1 and R2 and to a conductor at the same potential as point G which is, in turn, at the same potential as the non-inverting input terminal of the operational amplifier A1. The output voltage Vo is also proportional to either primary current Ip or secondary current Is.

Figure 3:
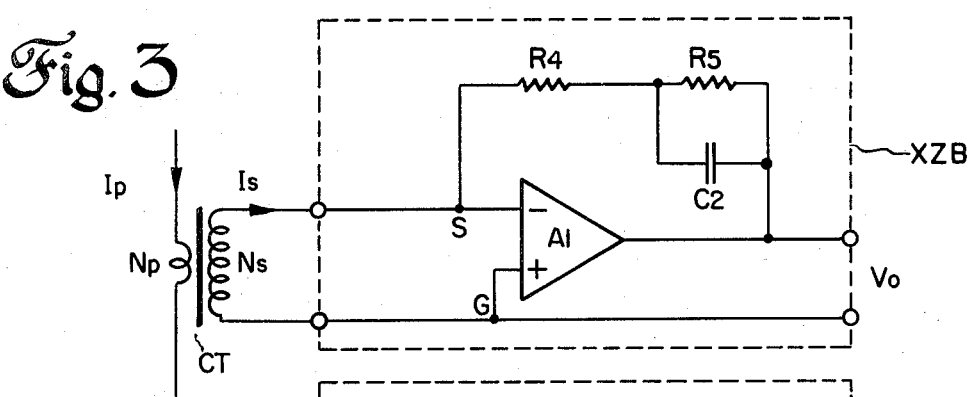
FIG. 3 is another schematic diagram showing another transimpedance amplifier terminating the secondary of a current transformer in a virtual short circuit condition while providing an output voltage Vo proportional to either primary or secondary transformer current and lagging transformer secondary current by a predetermined phase angle.

In FIG. 3 another embodiment of the invention is shown. Another transimpedance amplifier XZB is coupled to the secondary winding of the current transformer CT and the secondary winding thereof is virtually short circuited inasmuch as it is connected across the nodes or points S and G. The output voltage Vo in this case lags the secondary current Is by a predetermined phase angle. Amplifier A1, which may be the same Fairchild amplifier as hereinbefore identified, has two resistance elements R4 and R5 serially connected as shown between the point S and the output terminal of the amplifier A1. Connected in parallel with the resistance element R5 is a capacitor C2. In addition to lagging the secondary current Is the output voltage Vo is proportional to current in the secondary winding of the transformer. As stated, the secondary winding of the current transformer is virtually short circuited.

Figure 4:
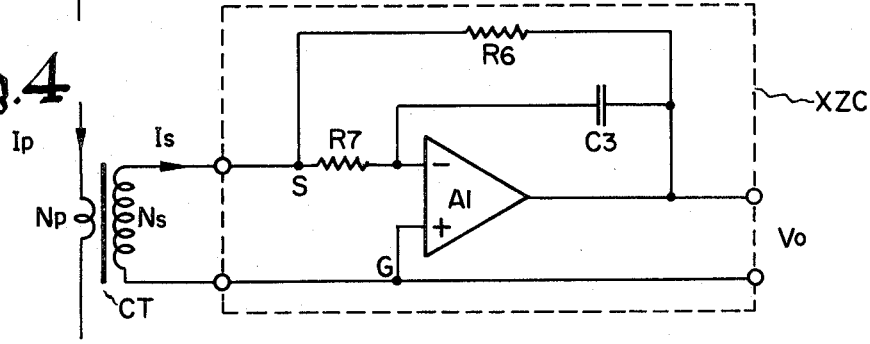
FIG. 4 is another schematic diagram showing another transimpedance amplifier terminating the secondary winding of a current transformer in a near short circuit condition while providing an output voltage Vo proportional to either primary or secondary transformer current and leading the transformer secondary current by a predetermined phase angle.

In FIG. 4 another transimpedance amplifier XZC is connected to the secondary winding of the current transformer CT. In this circuit the output voltage Vo leads the current Is in the secondary winding of the current transformer. The secondary winding of the current transformer operates at a near short circuit condition. The resistance element R7 has a relatively low ohmic resistance value and is connected, as shown, between point S and the inverting input terminal of the operational amplifier A1. The amplifier A1 may be the same operational amplifier hereinbefore identified manufactured by the Fairchild Corporation. Also a resistance element R6 is connected between the output terminal of the operational amplifier A1 and the point S. A capacitor C3 has one end thereof directly connected to the inverting input terminal of amplifier A1 and the other end thereof connected in common with one end of the resistance element R6 and the output terminal of amplifier A1. In addition to leading the secondary current Is the output voltage Vo is proportional to current in either the primary winding of the current transformer or in the secondary winding thereof. As stated hereinbefore the secondary winding of the current transformer is at a near short circuit condition.

Although specific embodiments of the invention have been illustrated and described in detail to illustrate the invention, it is to be understood that the invention may be otherwise embodied without departing from the spirit and scope of the invention which is hereinafter set forth in the claims.

What is claimed is:

1. In combination: a current transformer having primary and secondary windings; an operational amplifier having inverting and non-inverting input terminals and an output terminal, said secondary winding being connected between said inverting and non-inverting terminals; first and second resistance elements connected in series and forming a first series circuit connected between said inverting terminal and said output terminal; a third resistance element and a capacitance element connected in series and forming a second series circuit, said second series circuit having one end thereof connected between said first and second resistance elements and an opposite end thereof connected to said non-inverting input terminal, said inverting and non-inverting input terminals being at substantially the same potential.

2. The combination set forth in claim 1 wherein said one and opposite ends of said second series circuit are terminations of said third resistance element and said capacitance element, respectively.

3. In combination: a current transformer having primary and secondary windings; an operational amplifier having inverting and non-inverting input terminals and an output terminal, said secondary winding being connected between said inverting and non-inverting terminals; first and second resistance elements connected in series and forming a first series circuit connected between said inverting terminal and said output terminal; and, a capacitance element connected in parallel with said second resistance element, said inverting and non-inverting input terminals being at substantially the same potential.

4. The combination set forth in claim 3 wherein one end of said second resistance element and one end of said capacitance element is connected to said output terminal of said operational amplifier.

5. In combination: a current transformer having primary and secondary windings; an operational amplifier having inverting and non-inverting input terminals and an output terminal; a first resistance element connected in series between one end of said secondary winding and said inverting input terminal, the opposite end of said secondary winding being connected to said non-inverting input terminal; a second resistance element having one end thereof connected to said one end of said secondary winding and an opposite end thereof connected to said output terminal; and, a capacitance element having one end thereof connected to said inverting input terminal and the opposite end thereof connected to said output terminal; said one end of said secondary winding being at substantially the same potential as said non-inverting input terminal.

6. The combination set forth in claim 5 wherein said first resistance element has a relatively low ohmic resistance value.

7. In combination: a current transformer having primary and secondary windings adapted for conducting primary and secondary current, respectively; an operational amplifier having inverting and non-inverting input terminals and an output terminal; a resistance element having a relatively low ohmic resistance connected in series between said inverting input terminal and one end of said secondary winding, the other end of said secondary winding being connected to said non-inverting input terminal; and, at least one electrical impedance means coupled between said inverting input terminal and said output terminal so that an output voltage produced by said amplifier between said output terminal said non-inverting terminal thereof is displaced at a phase angle relative to current in said secondary winding, said non-inverting input terminal being at substantially the same potential as said one end of said secondary winding.

* * * * *